Sept. 24, 1963 NOBUO KITAMURA 3,105,110

TELEVISION RECEIVER CABINET APPARATUS

Filed Dec. 20, 1960

Inventor
Nobuo Kitamura by Hill, Sherman, Meroni, Gross & Simpson Attys.

United States Patent Office 3,105,110

Patented Sept. 24, 1963

3,105,110

TELEVISION RECEIVER CABINET APPARATUS

Nobuo Kitamura, Kawasaki-shi, Kanagawa-ken, Japan, assignor to Sony Corporation, Shinagawa-ku, Tokyo, Japan, a corporation of Japan Filed Dec. 20, 1960, Ser. No. 77,058
Claims priority, application Japan Dec. 21, 1959
3 Claims. (Cl. 178—7.9)

Figures 1, 2:
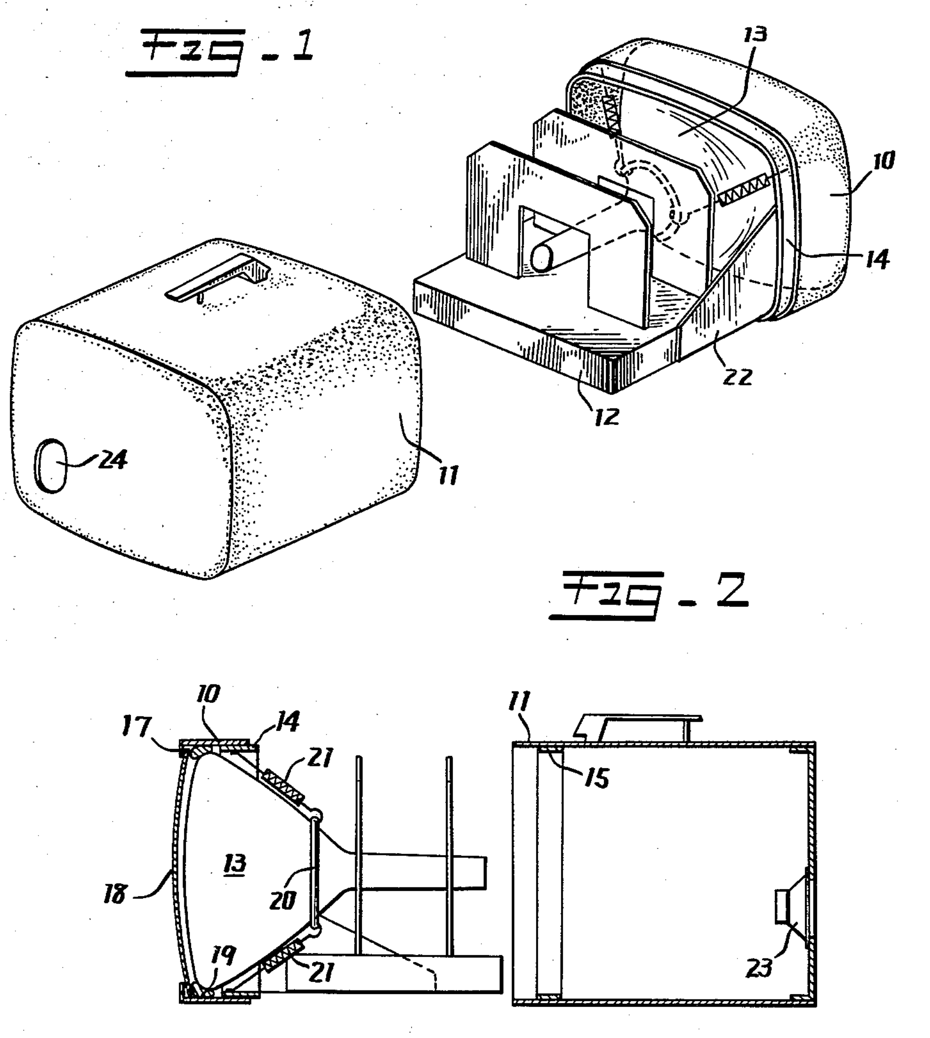

This invention relates to a television receiving apparatus and more particularly relates to a cabinet structure for such a television receiving apparatus and to a means for resiliently mounting a cathode ray receiving tube within the cabinet structure.

More specifically the invention is directed to a cabinet structure for containing a cathode ray receiving tube and its usual associated components which is designed to facilitate the assemblage of the device and the replacement or repair of the operating components thereof.

It is therefore a principal object of the present invention to provide a cabinet structure which can be readily disassembled to permit access to the operating components thereof.

Another object of the invention resides in the provision of a novel and improved means for removably mounting the cathode ray receiving tube of a television apparatus within its associated cabinet structure.

A still further object of the invention is to provide a means for resiliently mounting the cathode ray receiving tube within the cabinet structure to substantially eliminate breakage and mechanical fatigue of the tube caused by shock loads applied to the cabinet structure.

These and other objects, features, and advantages of the present invention will become apparent from time to time as the following specification proceeds and with reference to the accompanying drawings, wherein:

FIGURE 1 is a diagrammatic isometric view illustrating a cabinet structure having a cathode ray television receiving tube mounted therein in accordance with the principles of the present invention and in which the main casing of the cabinet structure is separated from the chassis thereof to permit free access to the receiving tube and its associated components; and FIGURE 2 is a vertical sectional view through the cabinet structure illustrated in FIGURE 1 and showing the receiving tube and its associated chassis in side elevation.

Referring initially to FIGURE 1, a television apparatus is diagrammatically illustrated as comprising a cabinet structure including a front tube casing 10 and a main casing 11. The chassis 12 and cathode ray receiving tube 13 are mounted within the tube casing 10 and the main casing 11 may be fitted over the chassis and tube to provide an integrated structure. Of course, the chassis would normally have numerous additional components mounted thereon but these components are not shown on the drawing since these additional components form no part of the present invention.

To provide a means for securely but detachably interconnecting the casings 10 and 11, band plates 14 and 15 are welded or otherwise rigidly secured to the inner surfaces of the respective casings. The band 14 is secured to the inner surface of the casing 10 so that one edge thereof protrudes from the rear edge of the casing 10. The band 15 is secured to the inner surface of the main casing 11 so that its edge is spaced inwardly of the front edge of the main casing 11 a distance which is approximately equal to the distance which the band 14 protrudes from the rear edge of the tube casing 10. Since the area and configuration of the open ends of the respective casings are identical, the casings may be placed together so that the band 14 is inserted within the open end of the main casing 11. Since the band 15 is spaced from the front edge of the main casing 11 the same distance that the band 14 extends from the tube casing 10, the two casings may be forced together until the bands contact one another and no appreciable gap between the front edge of the main casing 11 and the rear edge of the tube casing 10 will be present.

Frictional engagement between the band 14 and the inner surface of the main casing 11 will serve to rigidly but detachably secure the casings to one another to form an integrated cabinet structure. Furthermore, the presence of the bands 14 and 15 at the junction between the two casings will serve to reinforce and make more rigid the integrated cabinet structure.

In order to facilitate the inspection of various components mounted on the chassis 12, the length of the casing 10 is quite short so that only the front portion of the cathode ray receiving tube 13 is surrounded thereby.

Of course, the casings 10 and 11 may be formed of any suitable material and may, for instance, be formed of metal in a stamping process. It will further be understood that the configurations of the casings 10 and 11 can be varied to adapt the cabinet structure to the television apparatus to be mounted therein.

An inturned flange 17 is formed about the front peripheral edge of the tube casing 10 and serves as a support for a tube protecting transparent material which is made of such, for example, as glass or plastics.

A resilient cushioning element 19 is seated against the inner surface of the transparent material 18 and in turn provides a resilient support for the periphery of the front face of the cathode ray receiving tube 13. The cushioning element 19 may be glued to the peripheral inner surface of the transparent material 18 if desired or may be formed so that it will maintain this position as a result of its own stiffness.

The front end of the cathode ray tube 13 is inserted into the tube casing 10 with the periphery of the front face thereof seated on the cushioning element 19 and may be maintained in this position by a yoke 20 and a plurality of tension springs 21. The yoke 20 fits about the rear reduced diameter end of the cathode ray tube 13. The tension springs 21 are fixed to the tube casing 10 in each quadrant thereof and have their opposite ends secured to the yoke 20 so that the tube 13 will be biased into its seated position on the cushioning element 19. The springs 21 are connected to binding posts protruding from the tube casing 10 and have their opposite ends removably secured to the yoke 20. In fact, the free ends of the springs 21 may be curved so that they simply fit over and grip the yoke 20. Thus the springs 21 and yoke 20 serve as the sole means for resiliently supporting the tube 13 against the cushioning element 19. Furthermore, the springs can readily be removed from the yoke so that the tube can be removed from the casing 10 for examination or replacement.

The chassis 12 is supported on the tube casing 10 by means of a pair of side plates 22 which are bolted or otherwise rigidly secured to the casing 10 and chassis 12.

The speaker 23 can be affixed to the rear wall of the main casing 11 so that it overlies a fabric covered aperture 24 therein.

It will be understood that this embodiment of the invention has been used for illustrative purposes only and that various modifications and variations in the present invention may be made without departing from the spirit and scope of the novel concepts thereof.

I claim as my invention:

1. A television cabinet structure comprising: a cabinet having an aperture formed therein, an inturned flange extending from said cabinet around said aperture and extending radially inwardly thereof, a protecting transparent material engageable with said flange and closing said aperture, a cushioning element abutting said material adjacent the periphery thereof, a cathode ray receiving tube, a chassis containing the operating components for said tube mounted within said cabinet, and spring means detachably connected to said tube for biasing said tube into engagement with said cushioning element providing the sole means for mounting said tube within said cabinet and for maintaining said material in engagement with said flange.

2. A television cabinet structure comprising in combination: a main casing and a tube casing, an aperture formed within said tube casing, an inturned flange extending from said tube casing around said aperture and extending radially inwardly thereof, a protecting transparent material engageable with said flange on the inner surface thereof and closing said aperture, a cushioning element abutting said material adjacent the periphery thereof, a cathode ray receiving tube, a chassis containing the operating components for said tube, means mounting said chassis on said tube casing, spring means interconnecting said tube with said tube casing for biasing said tube into engagement with said cushioning element and providing the sole means for mounting said tube within said cabinet and for maintaining said material in engagement with said flange, and means for securing said main casing to said tube casing in frictional engagement therewith so that said main casing overlies the elements mounted on said tube casing.

3. A television cabinet structure comprising in combination: a main casing and a tube casing having an apertured end, a cathode ray receiving tube having a reduced diameter end, a chassis containing the operating components for said tube, means mounting said chassis on said tube casing, an inturned flange extending from said tube casing around said aperture and extending radially inwardly thereof, a protecting transparent material engageable with said flange on the inner surface thereof and closing said aperture, a cushioning element abutting said material adjacent the periphery thereof, a yoke fitting over the reduced diameter end of said tube, means detachably and resiliently securing said yoke to said cabinet adjacent the apertured end thereof to bias said tube into engagement with said cushioning element and to provide the sole means for mounting said tube within said cabinet and for maintaining said material in engagement with said flange, and means for securing said main casing to said tube casing so that said main casing overlies the elements mounted on said tube casing.

References Cited in the file of this patent

UNITED STATES PATENTS

| | | |
|---|---|---|
| 2,456,399 | Gethmann | Dec. 14, 1948 |
| 2,757,889 | Cady | Aug. 7, 1956 |
| 2,851,679 | Wayne | Sept. 9, 1958 |
| 2,870,438 | Solheim | Jan. 20, 1959 |
| 2,929,667 | Jackson | Mar. 22, 1960 |
| 2,936,448 | Marholz | May 10, 1960 |

FOREIGN PATENTS

| | | |
|---|---|---|
| 792,478 | Great Britain | Mar. 26, 1958 |
| 204,093 | Australia | June 25, 1959 |

OTHER REFERENCES

Rider TV Manual, vol. 10, copyright 1952, Dumont TV, pages 10–13.